(12) United States Patent
Kosaka et al.

(10) Patent No.: US 9,766,679 B2
(45) Date of Patent: Sep. 19, 2017

(54) POWER MONITORING DEVICE AND POWER MONITORING SYSTEM

(75) Inventors: Tadayoshi Kosaka, Tokyo (JP); Katsuya Miyata, Tokyo (JP); Hidetoshi Teraoka, Tokyo (JP)

(73) Assignee: HITACHI APPLIANCES, INC, Tokyo (JP)

( * ) Notice: Subject to any disclaimer, the term of this patent is extended or adjusted under 35 U.S.C. 154(b) by 392 days.

(21) Appl. No.: 14/394,592

(22) PCT Filed: Apr. 16, 2012

(86) PCT No.: PCT/JP2012/002607
§ 371 (c)(1),
(2), (4) Date: Oct. 31, 2014

(87) PCT Pub. No.: WO2013/157030
PCT Pub. Date: Oct. 24, 2013

(65) Prior Publication Data
US 2015/0076926 A1    Mar. 19, 2015

(51) Int. Cl.
*G06F 1/32* (2006.01)
*H02J 3/14* (2006.01)

(52) U.S. Cl.
CPC .................. *G06F 1/32* (2013.01); *H02J 3/14* (2013.01); *H02J 2003/143* (2013.01);
(Continued)

(58) Field of Classification Search
CPC .. G06F 1/32; Y10T 307/832; H02J 2003/143; Y02B 70/3225; Y02B 70/3266; Y04S 20/22; Y04S 20/224; Y04S 20/242
(Continued)

(56) References Cited

U.S. PATENT DOCUMENTS

| 2002/0163431 A1 | 11/2002 | Nakajima et al. |
| 2009/0018705 A1 | 1/2009 | Ouchi et al. |
| 2010/0274405 A1 | 10/2010 | Thomas et al. |

FOREIGN PATENT DOCUMENTS

| JP | 11-168833 A | 6/1999 |
| JP | 2007-236038 A | 9/2007 |

(Continued)

OTHER PUBLICATIONS

PCT International Search Report on application PCT/JP2012/002607 mailed May 29, 2012; pp. 1-2.
(Continued)

*Primary Examiner* — Hal Kaplan
(74) *Attorney, Agent, or Firm* — Foley & Lardner LLP

(57) ABSTRACT

The present invention pertains to a power monitoring device configured in such a manner as to make it as easy as possible to perform power monitoring, notification and control for customers in coordination with the power utilization rate of a utility grid. The power monitoring device is provided with: a target power setting unit that receives, from outside, information indicating the power utilization rate of a utility grid by time, and, with regard to time periods in which the power utilization rate is greater than a prescribed threshold value, reduces preset target power consumption levels, and sets target power consumption levels by time; and an assessment and control unit that obtains, from outside, the power usage of power-consuming devices, and performs control in order to save power for the power-consuming devices in time periods in which the obtained power usage exceeds the target power consumption level.

6 Claims, 14 Drawing Sheets

(52) U.S. Cl.
CPC ....... *Y02B 70/3225* (2013.01); *Y02B 70/3266* (2013.01); *Y04S 20/222* (2013.01); *Y04S 20/224* (2013.01); *Y04S 20/242* (2013.01); *Y10T 307/832* (2015.04)

(58) Field of Classification Search
USPC .......................................................... 307/126
See application file for complete search history.

(56) References Cited

FOREIGN PATENT DOCUMENTS

| | | | |
|---|---|---|---|
| JP | 2007-336796 | A | 12/2007 |
| JP | 2008-125295 | A | 5/2008 |
| JP | 4562307 | B2 | 10/2010 |

OTHER PUBLICATIONS

European Patent Office extended search report on application 12874405.9 received Dec. 4, 2015; 7 pages.

F I G. 7
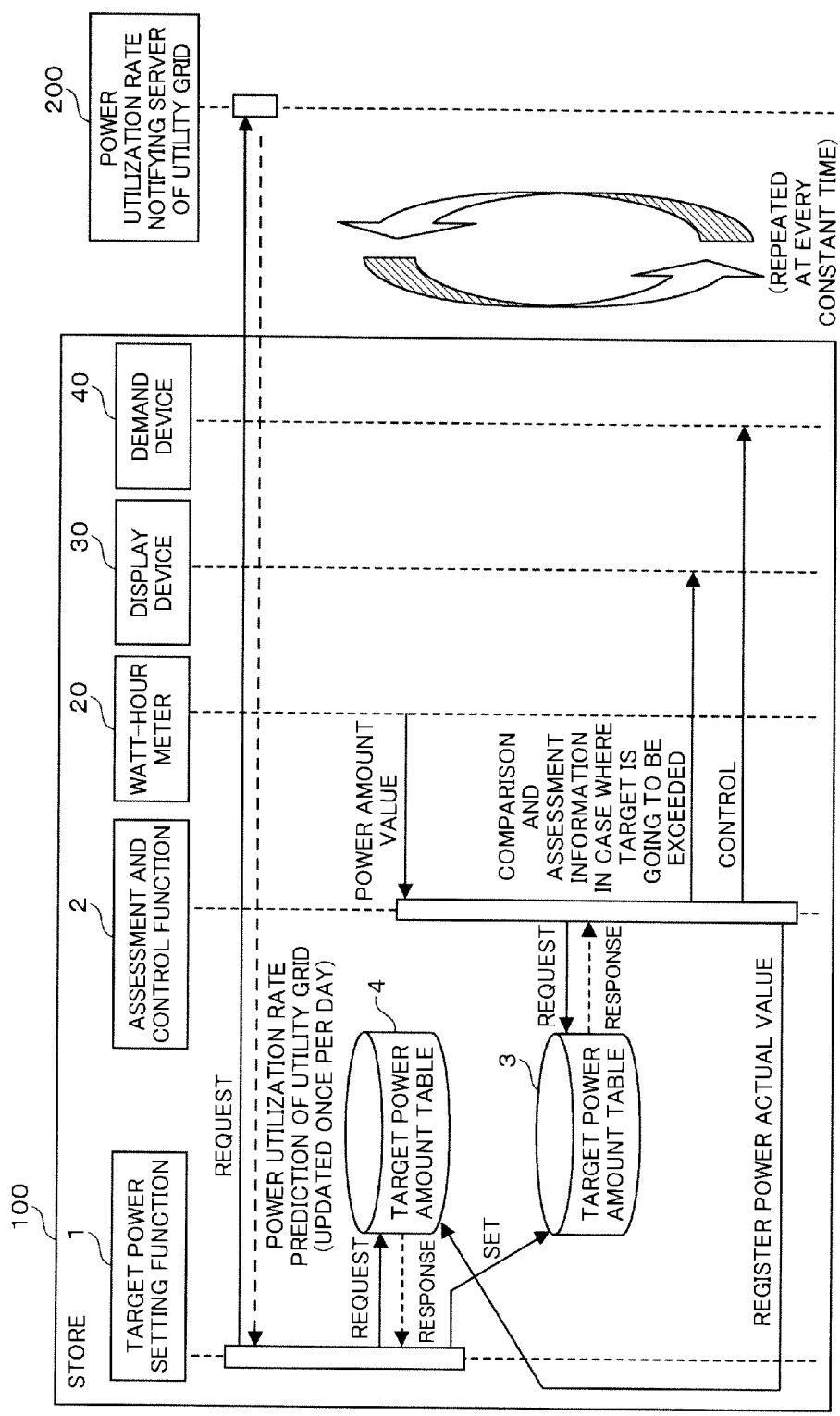

F I G. 1 2
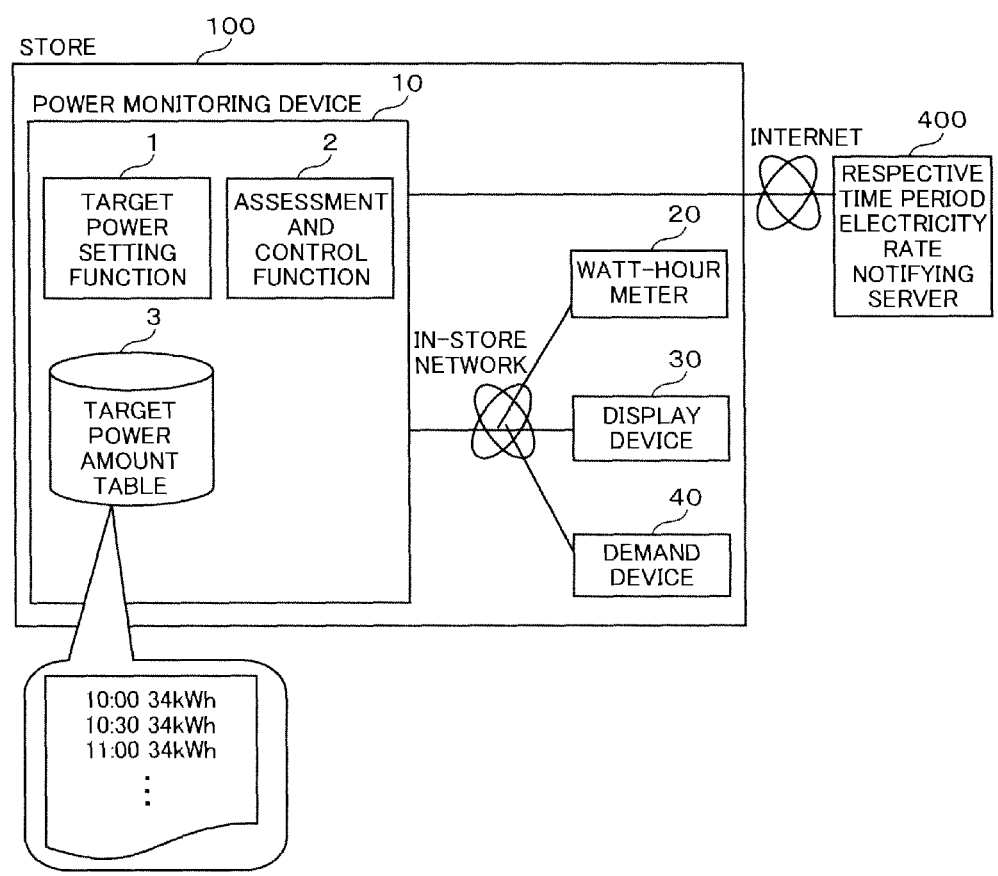

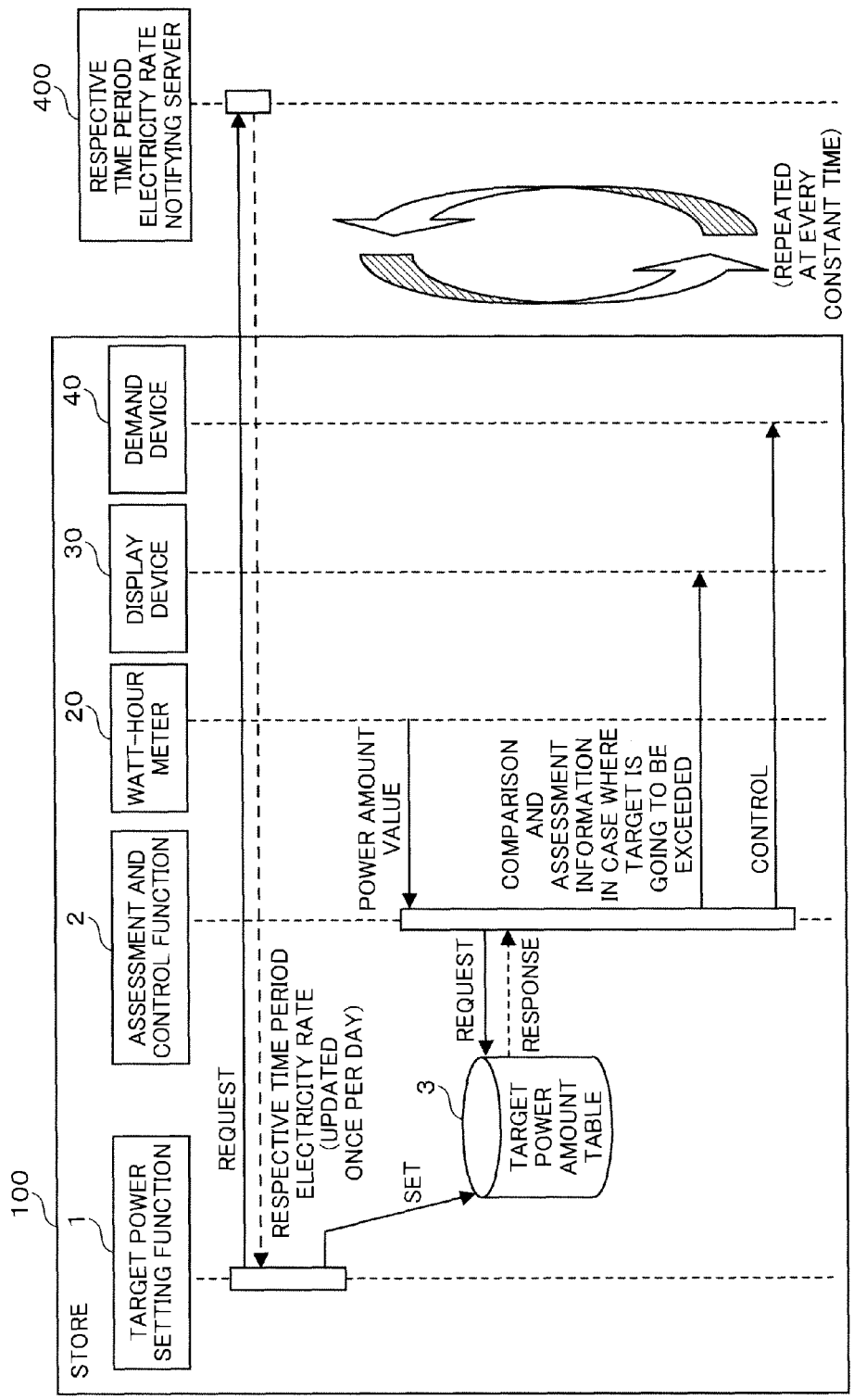

(PRIOR ART)

POWER MONITORING DEVICE AND POWER MONITORING SYSTEM

TECHNICAL FIELD

The present invention pertains to a power monitoring device or a power monitoring system for monitoring a power of a household, a store or the like, and restraining the power to be equal to or lower than a target power consumption level.

BACKGROUND ART

There is a demand contract system as a contract system of an electricity rate which is made between an owner of a store or a facility and a power industry. According to the demand contract system, an integrating power consumption demand is calculated for every prescribed demand time period (ordinarily, 30 minutes), and the electricity rate is determined with a maximum integrating power consumption demand in the integrating power consumption demands of respective demand time periods in one year as a reference. Therefore, it is necessary to always restrain the integrating power consumption demand in one demand time period to be low.

Hence, Patent Literature 1 discloses a power monitoring device which performs control (demand control) of predicting an integrating power consumption demand from when a demand time period is started to when the demand time period is finished in the midst of the demand time period, and stopping operating a specific device in a case where a predicted value exceeds a prescribed contract power amount.

Also, Patent Literature 2 discloses a power monitoring device which configures energy conservation advice and gives the advice to a user in a case where a predicted value going to exceed to a prescribed contract power amount.

A power monitoring device which performs control of measuring power consumption or a power consumption amount and stopping operating a specific device in a case where the power consumption amount is going to exceed a contract ampere number is on sale also in a household.

These devices individually perform power monitoring, notification, and control in respective customers of respective stores or facilities, or respective households or the like, and are operated independently from a power utilization rate of a utility grid in which the power industry supplies power to respective customers.

On the other hand, Patent Literature 3 discloses a system for integrally controlling plural demand devices of plural customers communicating with a utility grid and leveling a power utilization rate of the power grid.

CITATION LIST

Patent Literatures

Patent Literature 1: Japanese Unexamined Patent Application Publication No. 2007-236038
Patent Literature 2: Japanese Patent No. 4562307
Patent Literature 3: Japanese Unexamined Patent Application Publication No. 2007-336796

SUMMARY OF INVENTION

Technical Problem

Here, FIG. 14 shows a behavior of operating the power monitoring shown in Patent Literature 1 or 2 independently from the power utilization rate of the utility grid.

FIG. 14 shows an example of changing the power utilization rate of the utility grid in one day at an upper stage, and shows an example of changing a power consumption amount per every constant time of a certain store at a lower stage.

As shown in the lower stage of FIG. 14, a target power consumption level of a contract power amount of a store or the like is set to a constant value regardless of the power utilization rate of the utility grid. Therefore, the power amount of the store is lower than the target power consumption level, and does not become an object of power reduction even in a time period from 12:00 to 17:00 during which power demand and supply of the utility grid is tight. Conversely, in a time period from 18:00 to 21:00 during which the power demand and supply of the utility grid is not tight, the power consumption amount of the store exceeds the target power consumption level, and becomes the object of the power reduction.

In this way, in the power monitoring shown in Patent Literature 1 or 2, although the electricity rate can be reduced, the power monitoring does not contribute to reduce the high power utilization rate of the utility grid.

If the power utilization rate of the utility grid exceeds 100%, a supply amount is smaller than the demand of the utility grid, and brings about a harmful influence of lowering a frequency, lowering a voltage, bringing about electricity interruption and so on.

In order to resolve the problem, it is necessary to introduce a system of increasing a power supply capability, or controlling the power demand by unitarily controlling demand devices of respective customers.

However, in order to increase the power supply capability, a large-scaled investment and construction time of year unit are needed. Also, the system of controlling the power demands of the respective customers as shown in Patent Literature 3 becomes a large-scaled system over a total of an area, and it is difficult to introduce the system to an area in which people have already dwelt and carry out economic activities.

Hence, it is an object of the present invention be able to carry out power monitoring, notification, and control in the customer as easily as possible in coordination with the power utilization rate of the utility grid.

Solution to Problem

In order to achieve the object described above, for example, a configuration described in the scope of claims is adopted.

Advantageous Effects of Invention

According to the present invention, power saving can be carried out in coordination with a power utilization rate of a utility grid, the utility grid can be stabilized, and electricity interruption can be made to be difficult to be brought about by making the target power consumption level lower than that in normal time in a time period in which the power utilization rate of the utility grid is larger than a previously set threshold.

Also, the utility grid can be stabilized without developing a large-scaled system by operating a device which individually performs power monitoring, notification, and control at every customer as easily as possible independently in coordination with the power utilization rate of the utility grid.

BRIEF DESCRIPTION OF DRAWINGS

FIG. 7 is a sequence diagram of the third embodiment.

FIG. 12 is a configuration diagram of the power monitoring device according to the sixth embodiment and a system including the same.

FIG. 13 is a sequence diagram of the sixth embodiment.

DESCRIPTION OF EMBODIMENTS

Embodiments will be explained in reference to the drawings as follows.

Incidentally, although an example of power monitoring at a store will be explained in the following, not a store but a facility or a household will do. Also, although in the following, an object of a power to be monitored will be explained by using a power consumption amount (Wh) in a prescribed time period, not the power consumption amount (Wh) but an instantaneous power (W) will do.

First Embodiment

Figure 1:
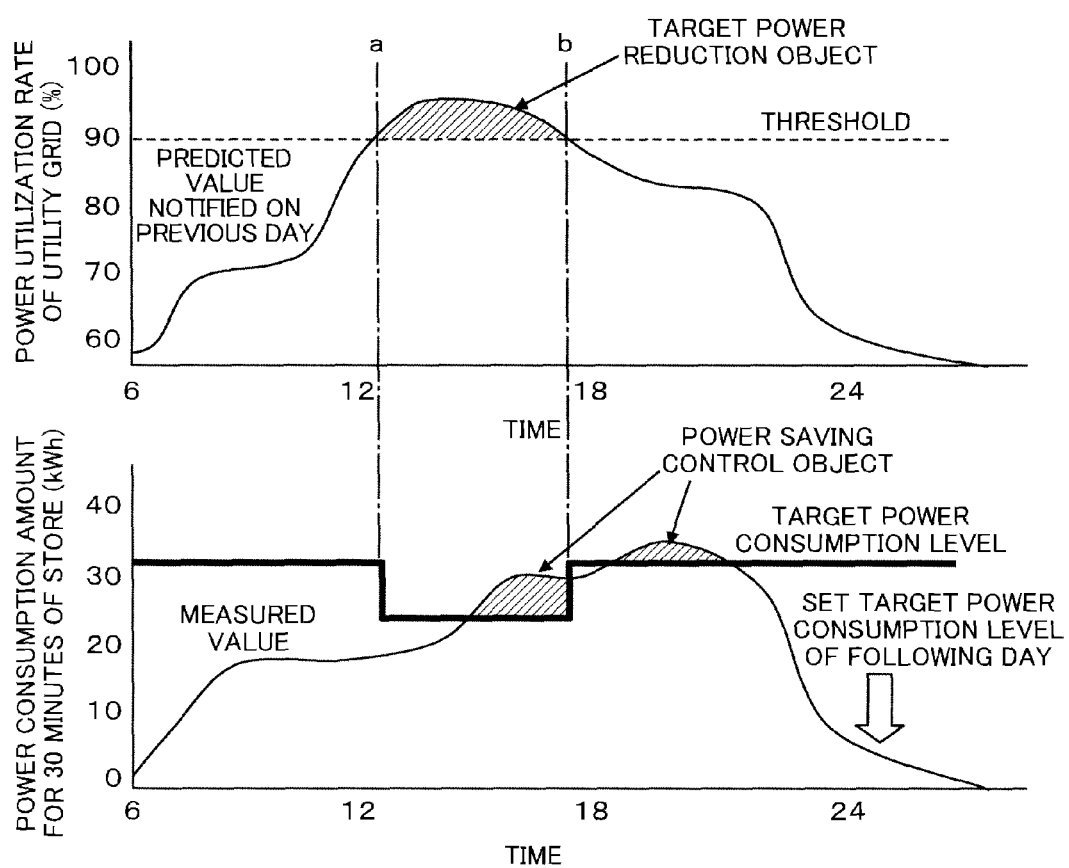
FIG. 1 illustrates diagrams of explaining a monitoring situation of a power monitoring device according to a first embodiment.

FIG. 1 illustrates diagrams of explaining a monitoring situation of a power monitoring device according to a first embodiment.

Figure 14:
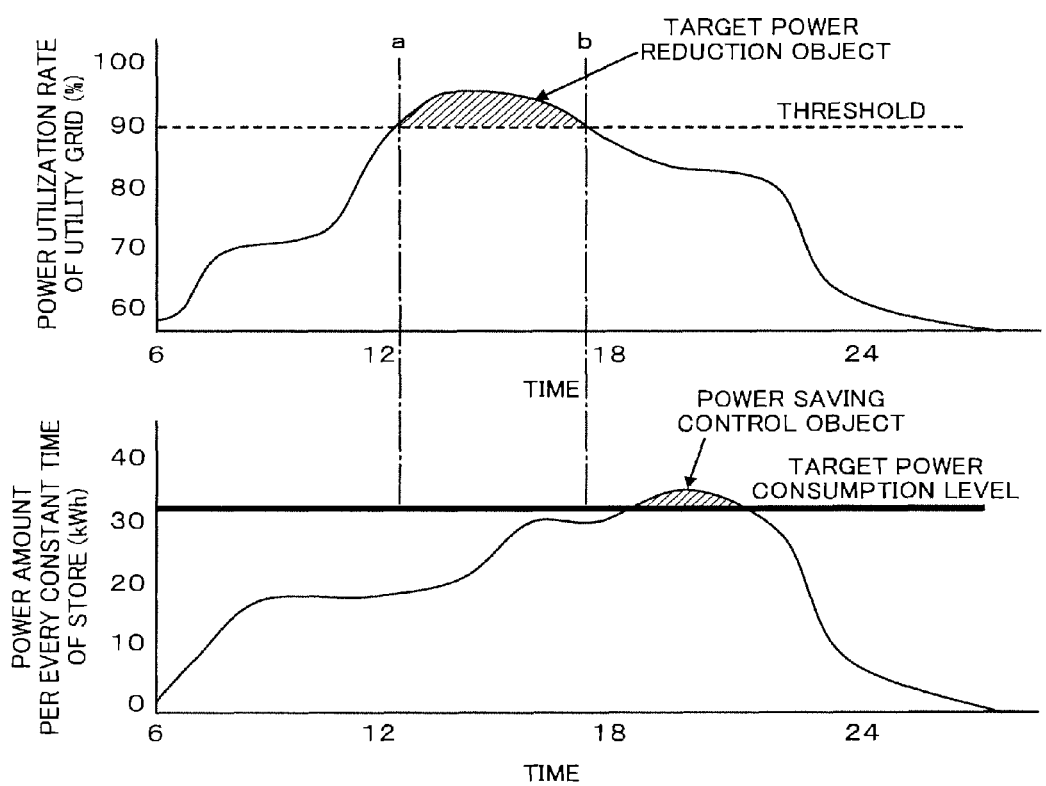
FIG. 14 illustrates diagrams showing a state of operating power monitoring independently from a power utilization rate of a utility grid.

An example of a predicted value for one day of a power utilization rate of a utility grid is shown at an upper stage, and a change of a measured value of a power consumption amount for 30 minutes of every o'clock 0 minute through 30 minute or 30 minute through 60 minute at a certain store is shown at a lower stage. Also, a target power consumption level is made to be set to a constant value previously as shown in FIG. 14. The target power consumption level may be set by the discretion of a user, or may be set based on a contract power amount of a power industry.

The target power consumption level previously set at the lower stage is reduced by a prescribed rate (20% in example of drawing) at a time point a at which a power utilization rate of a utility grid becomes larger than a certain threshold (90% in example of drawing). Thereafter, the target power consumption level of the store at the lower stage is set to a former value at a time point b at which the power utilization rate of the utility grid becomes smaller than the threshold. Further, power saving is made to be carried out in a case where the measured value of the power consumption level exceeds the target power consumption level.

Thereby, the power saving is carried out at the store also in a time period during which the power demand and supply of the utility grid is tight, and the power saving is carried out at the store in a case where the power demand of the store exceeds the target power consumption level in a time period in which the power demand and supply of the utility grid is not tight. In setting the target power consumption level, for example, that for the following day is set at 1:00 in the morning.

Incidentally, although according to the present embodiment, a power consumption amount of 30 minutes of every o'clock 0 minute through 30 minute or 30 minute through 60 minute is prescribed based on an electricity rate system for an enterprise in Japan at the time of 2011 year. However, not 30 minutes but another time unit may be used depending on the power rate system contracted.

Figure 2:
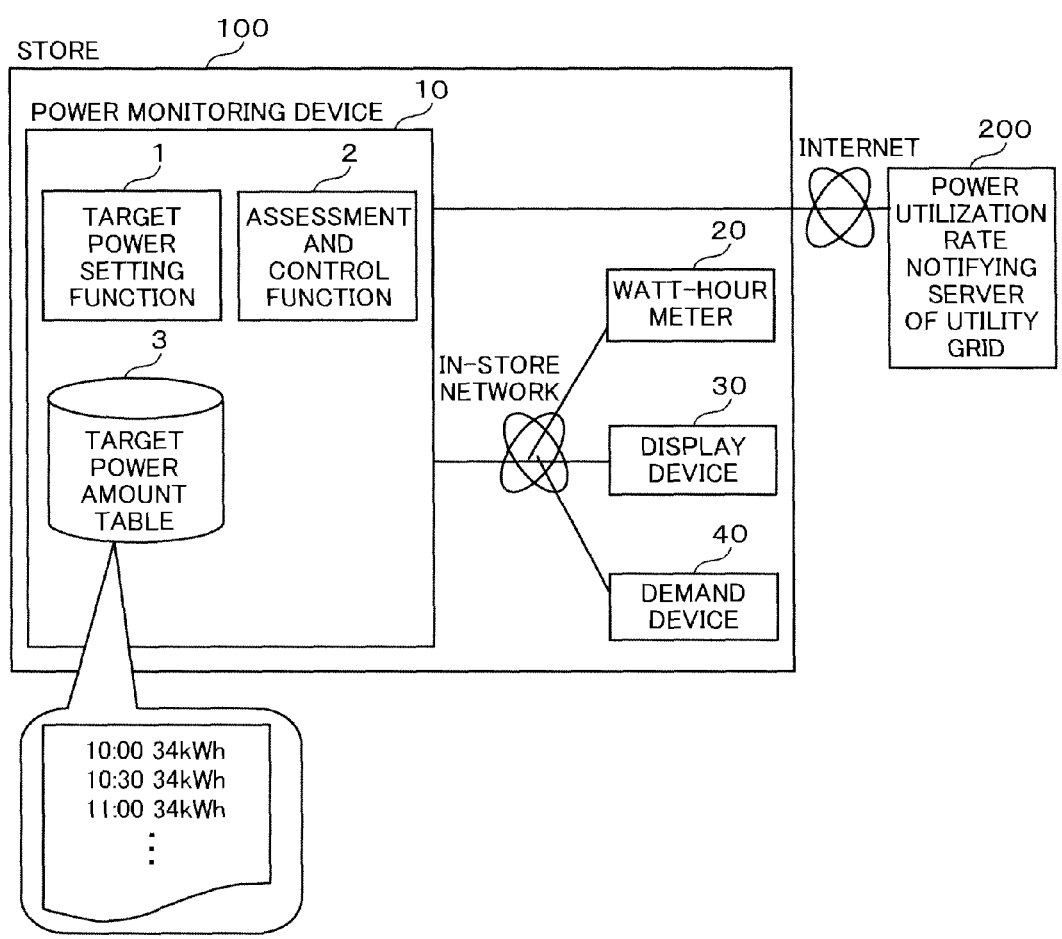
FIG. 2 is a configuration diagram of the power monitoring device according to the first embodiment and a system including the same.

FIG. 2 shows a configuration diagram of the power monitoring device according to the first embodiment and a system including the same. A power monitoring device 10, a watt-hour meter 20, a display device 30, and a demand device 40 are arranged in a store 100, and connected to each other by an in-store network. The power monitoring device 10 includes a target power setting function 1, an assessment and control function 2, and a target power amount table 3.

The target power amount table 3 is a table configured by time and a target power consumption level, and a time unit is preferably set for every 30 minutes in conformity with a time interval of a conventional demand control. Not the 30 minutes value but another time unit may be used depending on the electricity rate system contracted. The power monitoring device 10 is connected to a power utilization rate notifying server 200 of a utility grid at outside of the store 100 via the internet.

Figure 3:
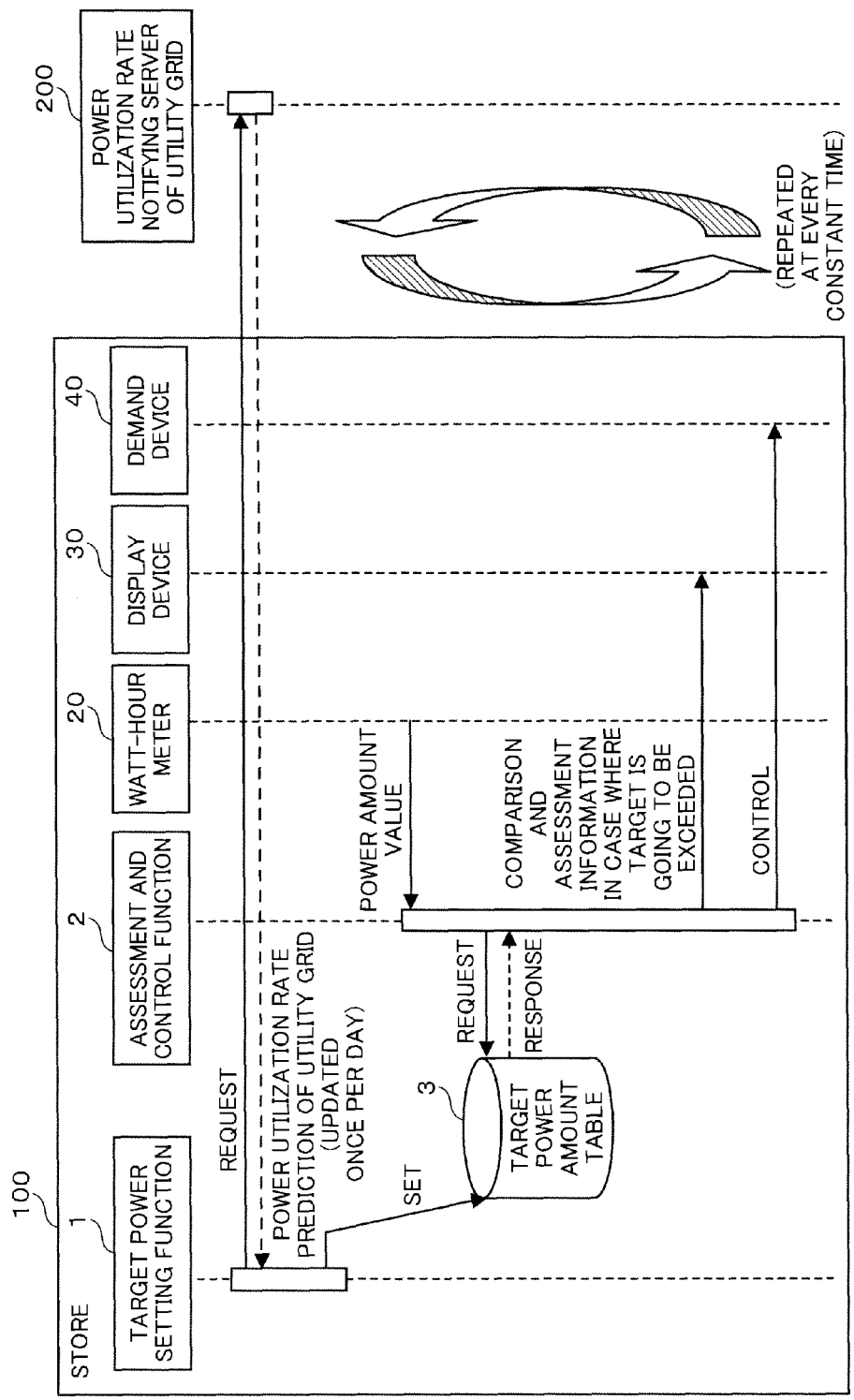
FIG. 3 is a sequence diagram of the first embodiment.

FIG. 3 shows a sequence diagram of the first embodiment.

The target power setting function 1 previously sets a target power consumption level as shown in FIG. 14.

The target power setting function 1 requests the power utilization rate notifying server 200 of utility grid to transmit power utilization rate prediction information of the utility grid held by the power utilization rate notifying server 200. The power utilization rate prediction information is information configured by time and the utilization rate as shown at the upper stage of FIG. 1.

In response to the request, the power utilization rate notifying server 200 transmits the power utilization rate prediction information of the utility grid, and the target power setting function 1 receives the information.

When the target power setting function 1 receives the power utilization rate prediction information, the target power setting function 1 reduces the target power consumption level which is previously set with regard to a time period in which the power utilization rate exceeds a prescribed threshold by a prescribed rate and sets the target power amount information for every unit time period. Thereafter, the target power setting function 1 registers the set target power consumption level information to the target power amount table 3. The target power consumption level information is information configured by time and the target power consumption level as shown at the lower stage of FIG. 1.

Although the target power level may be updated at a time interval of once per day, for example, at 1:00 in the morning, the updating time and the updating interval are not limited thereto.

The wattmeter 20 measures and holds a power usage amount used at the demand device 40.

The assessment and control function 2 obtains the power usage amount held by the wattmeter 20 at every previously determined time period. Further, the assessment and control function 2 obtains the set target power consumption level from the target power amount table 3 by requesting.

Further, the assessment and control function 2 compares a power amount integrated value for every o'clock 0 minute through 30 minute or 30 minute through 60 minute based on the power usage amount and the target power consumption level, and transmits notification information urging power saving to the display device 30 in a case where the power amount integrated value exceeds the target power consumption amount, and the display device 30 receiving the notification information displays the notification information. A supervisor who looks at the notification information reduces the power usage amount by manipulating the demand device 40 in a case of carrying out power saving.

Or, the assessment and control function 2 transmits control information for setting power saving to the demand device 40, and the demand device 40 receiving the control information sets power saving in accordance with the control information. The demand device 40 is a power consuming device of, for example, a television set, an air conditioner, an illuminating device, a refrigerating device or the like.

As the operations therefor, the operation of cutting the power supply, the operation of changing temperature setting of an air conditioner, the operation of restricting an output of an air conditioner outdoor unit, the operation of restricting a brightness of illumination, and the operation of weakening an intensity of a refrigerating device are conceivable. There may be the plural display devices 30 and the plural demand devices 40. Particularly, in a case where there are the plural demand devices 40, priority orders may be attached to the plural demand devices 40, the operation may be carried out from the demand device 40 having a lower priority order, and in a case where the power usage amount is not lower than the target power consumption level, the demand device having a next priority may be operated.

According to the present embodiment, the power is reduced by controlling the demand device by making the target power consumption level lower than that in a normal time in a time period in which the power utilization rate of the utility grid is larger than the previously set threshold, or reducing the power of the demand device by notifying the user in a case where the power usage amount is going to exceed the target power consumption amount.

When such a power saving operation is carried out at a number of stores or a number of households, electricity interruption or the like can be prevented by stabilizing the utility grid by reducing the power utilization rate of the power grid.

Further, the operation can be dealt with by only making the target power consumption level of an existing power monitoring device variable, and construction or addition of function can be minimized.

Second Embodiment

Figure 4:
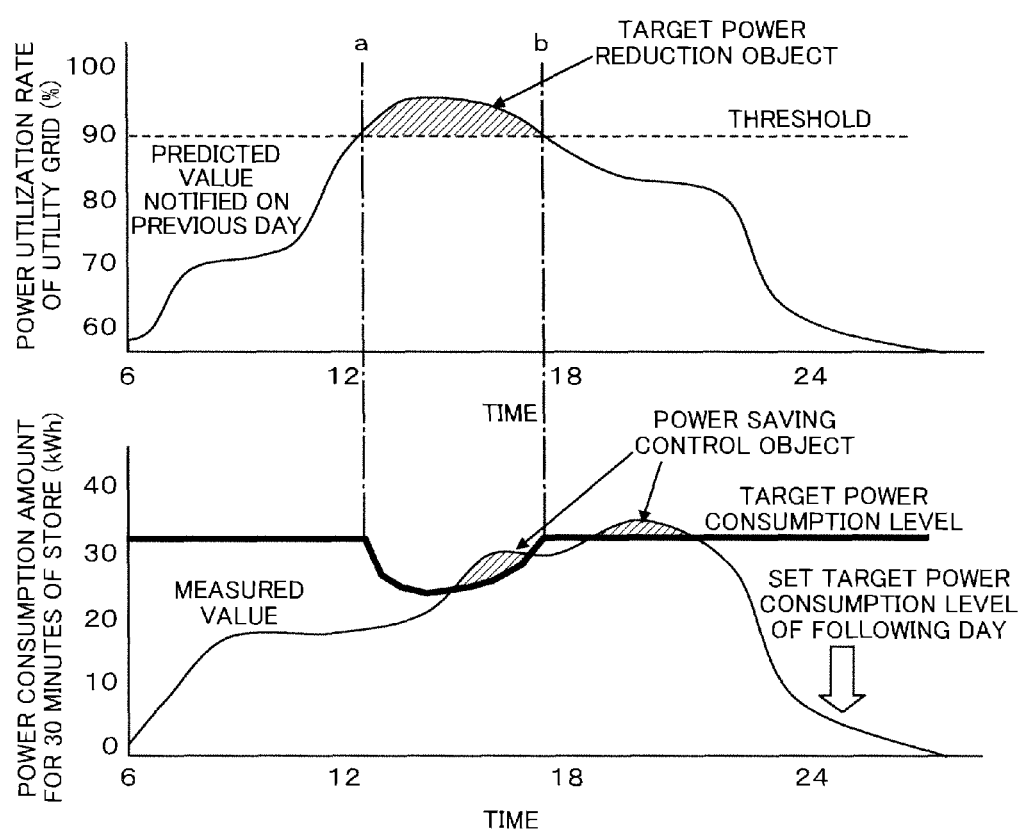
FIG. 4 illustrates diagrams of explaining a monitoring situation of a power monitoring device according to a second embodiment.

FIG. 4 illustrates diagrams for explaining a monitoring situation of a power monitoring device according to a second embodiment.

In FIG. 4, a method of reducing the target power consumption level is changed from that in FIG. 1.

According to the present embodiment, as shown in FIG. 4, a magnitude of reducing the target power consumption level which is previously determined in the store is changed in accordance with a magnitude of the power utilization rate of the utility grid at a time period in which the power utilization rate of the utility grid exceeds the threshold. That is, the previously determined target power consumption level is reduced by an amount of a rate of the power utilization rate exceeding the threshold at a time period in which the power utilization rate of the utility grid exceeds the prescribed threshold. Although a time interval of changing the target power consumption level is preferably every 30 minutes used in the demand contract of the electricity rate, not every 30 minutes but another time unit may be used depending on the electricity rate system contracted.

A configuration diagram of the present embodiment is the same as FIG. 2 of the first embodiment, and a sequence diagram thereof is the same as FIG. 3 of the first embodiment. However, the target power consumption level information set at the target power setting function 1 becomes information configured by time and the target power consumption level shown at the lower stage of FIG. 4.

According to the present embodiment, the target power consumption level may not be changed instantaneously by an amount less than the target power consumption level of the first embodiment. Therefore, the power saving may not be carried out more than necessary.

Third Embodiment

According to the first and the second embodiments, the target power consumption level is reduced at a time period in which the demand of the utility grid is tight.

However, in a case where the power usage of the store is sufficiently smaller than the target power consumption level in normal time at the time period in which the demand of the power unit is tight, the reduced target power consumption level is not exceeded and the power saving cannot be carried out.

According to the present embodiment, the target power consumption level is set with a predicted value of the power usage amount of the store as a reference in a time period in which the power utilization rate of the utility grid exceeds a prescribed threshold.

Figure 5:
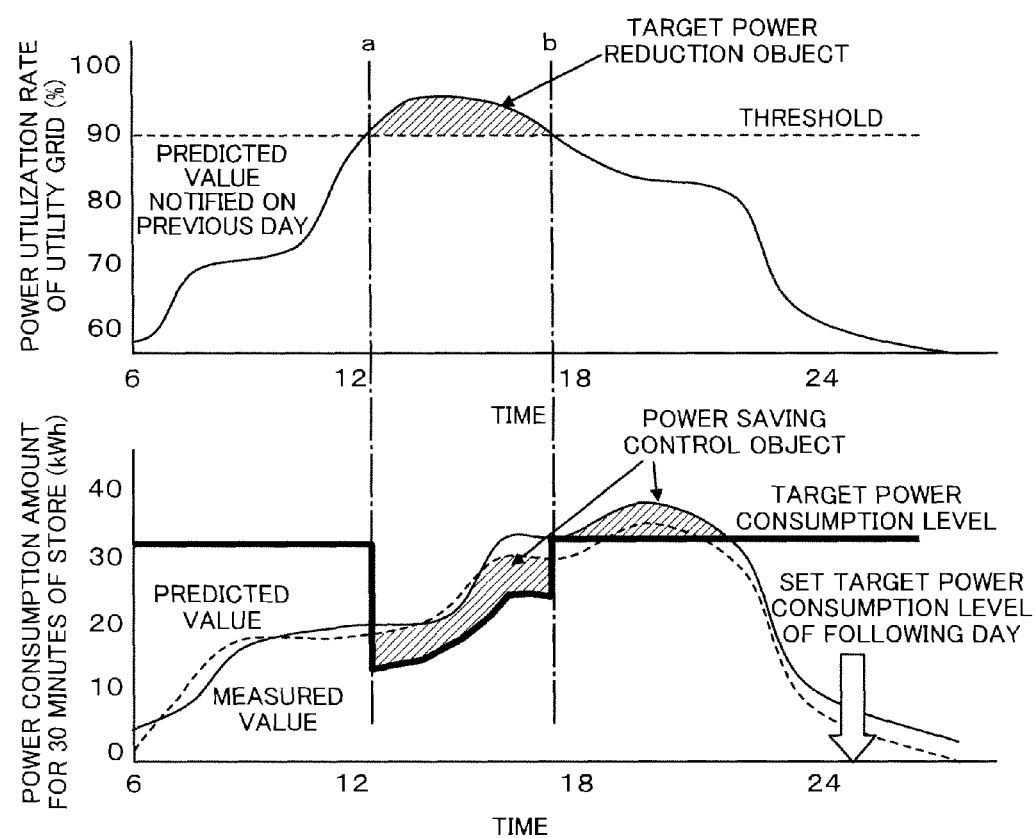
FIG. 5 illustrates diagrams of explaining a monitoring situation of a power monitoring device according to a third embodiment.

FIG. 5 illustrates diagrams for explaining a monitoring situation of a power monitoring device according to the third embodiment.

In FIG. 5, the upper stage shows an example of a predicted value for one day of the power utilization rate of the utility grid, and the lower stage shows changes of the predicted value and a measured value of a power amount 30 minutes at every o'clock 0 minute through 30 minute or 30 minute through 60 minute at a certain store. Also, the target power consumption level is made to be previously set to a constant value as shown in FIG. 14. The target power consumption level may be set at the user's discretion, or may be set based on the contract power amount of the power industry.

The target power consumption level of the store at the lower stage is reduced from the predicted value of the power consumption amount by a constant value at a time point at which the power utilization rate of the utility grid becomes larger than a certain threshold (90% in the example of the drawing). Thereafter, the target power consumption level of the store at the lower stage is set to a former value at a time point b at which the power utilization rate of the utility grid becomes smaller than the threshold. Further, the power saving is made to be carried out in a case where the measured value of the power amount exceeds the target power consumption level.

Figure 6:
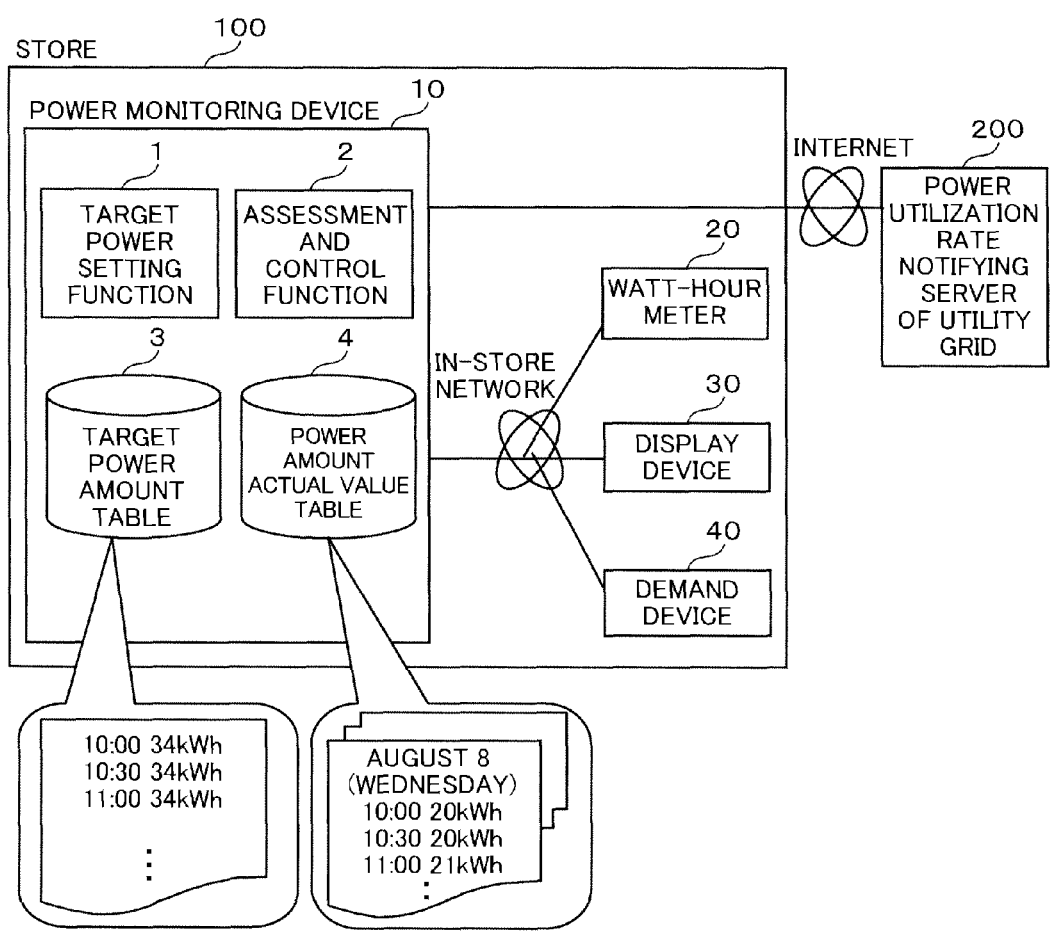
FIG. 6 is a configuration diagram of the power monitoring device according to the third embodiment and a system including the same.

FIG. 6 shows a configuration diagram of the power monitoring device and a system including the same of the third embodiment. What differs from FIG. 2 is that a past power amount actual value table 4 is added to the power monitoring device 10. The power amount actual value table 4 is recorded with a power usage amount history, atmospheric temperature, day of week, classification of holiday/weekday in the past.

FIG. 7 shows a sequence diagram of the third embodiment.

The target power setting function 1 is previously set with the target power consumption level as shown in FIG. 14.

The target power setting function 1 requests the power utilization rate notifying server 200 of the utility grid to transmit the power utilization rate prediction information of the utility grid held by the power utilization rate notifying server 200. The power utilization rate prediction information is information configured by time and the utilization rate shown at the upper stage of FIG. 5.

In response to the request, the power utilization rate notifying server 200 transmits the power utilization rate prediction information of the utility grid, and the target power setting function 1 receives the information. Further, the target power setting function 1 obtains actual power amount information of power usage amount history, atmospheric temperature, day of week, classification of holiday/weekday in the past held by a power amount actual value table 4 by requesting. The target power setting function 1 calculates a predicted value of a power usage amount of the obtained actual power amount information.

When the power setting function 1 receives the power utilization rate prediction information and calculates the predicted value of the power usage amount, the target power setting function 1 changes the previously set target power consumption amount to the target power consumption level which is reduced from the predicted value of the power usage amount by a prescribed value with regard to the time period in which the power utilization rate exceeds the prescribed threshold, and sets the target power consumption amount information for every unit time period. Thereafter, the target power setting function 1 registers the set target power consumption level information to the target power consumption level table 3. The target power consumption amount information is information configured by time and the target power consumption level as shown at the lower stage of FIG. 5.

Although the target power consumption level may be updated by once per day, for example, 1:00 in the morning, the updating time and the updating interval are not limited thereby.

Comparison and assessment, notification, and control of the target power consumption level and the power usage amount which are carried out by the assessment and control function 2 thereafter are similar to those in the explanation of FIG. 3. Incidentally, the assessment and control function 2 registers an actual power consumption amount obtained from the watt-hour meter to the actual power amount value table 4 at any time.

According to the present embodiment, the target power consumption amount is reduced from the predicted value of the power usage amount at the time period in which the power utilization rate of the utility grid is larger than the previously set threshold, and in a case where the power usage amount is going to exceed the target power consumption level, the power of the demand device is reduced by notifying the user of the case or the power is reduced by controlling the demand device.

Therefore, in the time period in which the power utilization rate of the utility grid is larger than the previously set threshold, even in a case where a measured value approximated to the predicted value of the power usage amount is low, the power usage amount can firmly be reduced.

When such a power saving is carried out at a number of stores or a number of households, the power utilization rate of the utility grid is reduced, the utility grid is stabilized, and electricity interruption or the like can be prevented.

Fourth Embodiment

Figure 8:
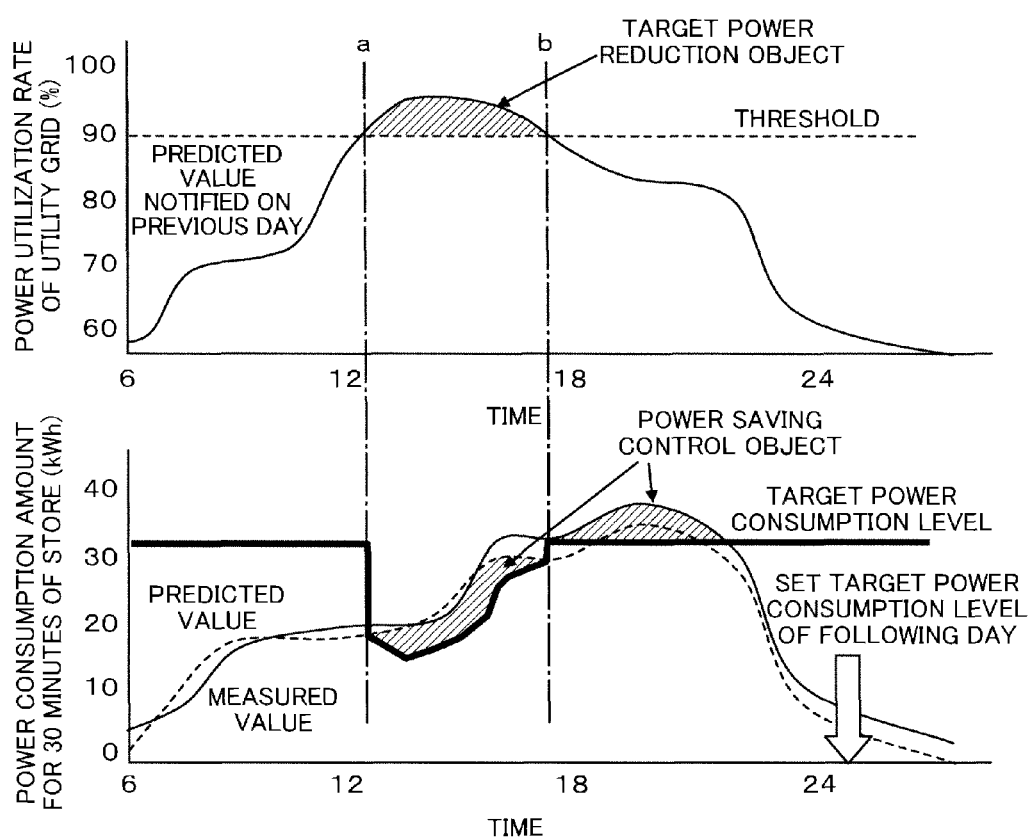
FIG. 8 illustrates diagrams of explaining a monitoring situation of a power monitoring device according to a fourth embodiment.

FIG. 8 illustrates diagrams for explaining a monitoring situation of a power monitoring device according to a fourth embodiment.

In FIG. 8, a method of reducing a target power consumption level is changed from that in FIG. 5.

According to the present embodiment, as shown in FIG. 8, in a time period in which the power utilization rate of the utility grid exceeds a prescribed threshold, a magnitude of reducing a previously determined target power consumption level in the store from a predicted value of a power usage amount is changed in accordance with a magnitude of the power utilization rate of the utility grid. That is, in the time period in which the power utilization rate of the utility grid exceeds the prescribed threshold, the target power consumption level is set by reducing the level from the predicted value of the power usage amount by an amount of a rate by which the power usage rate exceeds the threshold. Although a time interval of changing the target power consumption level is preferably every 30 minutes which is used in the demand contract of the electricity rate, not every 30 minutes but another time unit may be used depending on the electricity rate system contracted.

A configuration diagram of the present embodiment is the same as FIG. 6 of the third embodiment, and a sequence diagram thereof is the same as FIG. 7 of the third embodiment. However, target power amount information set at the target power setting function 1 becomes information configured by time and the target power consumption level shown at the lower stage of FIG. 8.

According to the present embodiment, the target power consumption level may not be changed by a large amount instantaneously in comparison with the target power consumption level of the third embodiment. Therefore, the power saving may not be carried out more than necessary.

Fifth Embodiment

According to the present embodiment, an explanation will be given of other configuration diagram and other sequence diagram executing power monitoring as shown in FIG. 5 of the third embodiment and FIG. 8 of the fourth embodiment.

Figure 9:
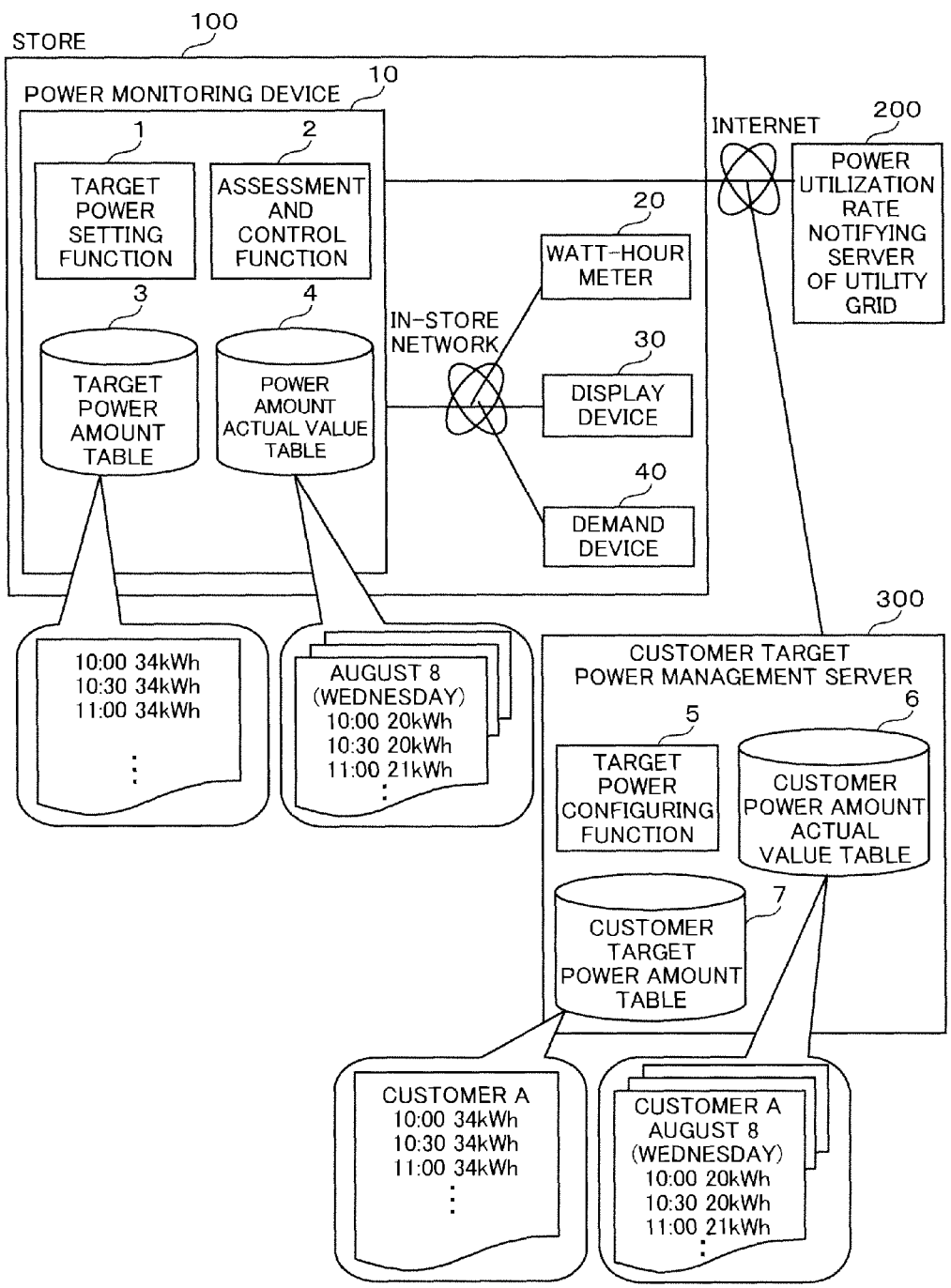
FIG. 9 is a configuration diagram of a power monitoring device according to a fifth embodiment and a system including the same.

FIG. 9 shows a configuration diagram of a power monitoring device of the fifth embodiment and a system including the same. What differs from FIG. 6 is that the power monitoring device 10 is connected to a customer target power management server 300 newly via the internet.

The customer target power management server 300 can be connected to the power monitoring device 10 of plural customers of plural stores, plural households or the like. Further, the customer target power management server 300 includes a target power configuring function 5, a customer power amount actual value table 6 which is recorded with a power amount actual value of every customer, and a customer target power table 7 which is recorded with a target power amount of every customer.

Figure 10:
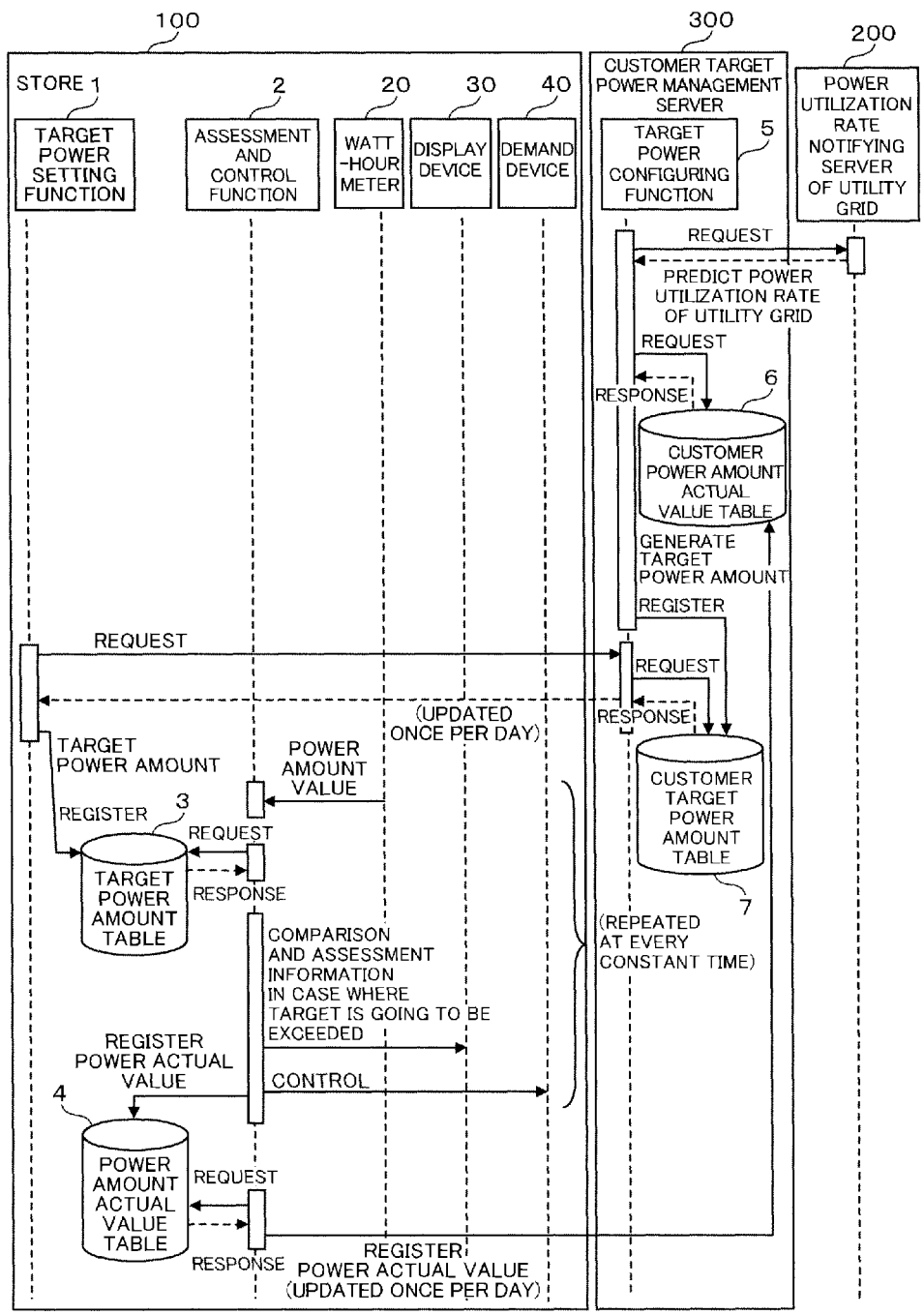
FIG. 10 is a sequence diagram of the fifth embodiment.

FIG. 10 shows a sequence diagram of the fifth embodiment.

The target power setting function 5 in the customer target power management server 300 sets the target power level previously as shown in FIG. 14.

The target power configuring function 5 in the customer target power management server 300 requests the power utilization rate notifying server 200 of the utility grid to transmit the power utilization rate prediction information of the utility grid held by the power utilization rate notifying server 200. The power utilization rate prediction information is information configured by time and the utilization rate as shown in upper stages of FIG. 5 and FIG. 8.

In response to the request, the power utilization rate notifying server 200 transmits the power utilization rate prediction information of the utility grid, and the target power configuring function 5 receives the information. Also, the target power configuring function 5 obtains actual power amount information of power usage amount history, atmospheric temperature, day of week, classification of holiday/weekday, season and the like in the past for every customer held by the customer power amount actual table 6 by requesting. The target power configuring function 5 calculates a predicted value of a power usage amount of every customer from actual power amount information of every customer obtained.

When the target power configuring function 5 calculates the predicted value of the power usage amount by receiving the power utilization rate prediction information, as shown in FIG. 5 or FIG. 8, the target power configuring function 5 changes the target power consumption level which is previously set with regard to the time period in which the power utilization rate exceeds the prescribed threshold to the target power consumption level which is reduced from the predicted value of the power usage amount, and configures the target power consumption amount information for every unit time of every customer. Thereafter, the target power configuring function 5 registers the set target power consumption level information to the customer target power amount table 7.

The target power setting function 1 in the store 100 requests the customer target power management server 300 to transmit the target power amount information registered in the customer target power amount table 7.

In response to the request, the customer target power management server 300 transmits the target power consumption level information of the store 100, and the target power setting function 1 receives the same.

The target power setting function 1 sets the target power consumption level information of every unit time period based on the target power consumption level information received and registers the information to the target power amount table 3. The target power consumption level information is information configured by time and the target power consumption level as shown in the lower stages of FIG. 5 and FIG. 8.

Although the target power amounts of the customer target power amount tale 7 and the target power amount table 3 may be updated at an interval of once per day, for example, at 1:00 in the morning, the updating time and the updated interval are not limited thereby. Comparison and assessment, notification, and control of the target power amount and the power usage amount performed by the assessment and control function 2 thereafter are the same as those in the explanation of FIG. 3.

Incidentally, the assessment and control function 2 registers the actual power amount obtained from a power system to the power amount actual value table 4 at any time, and registers registered data to the customer power amount actual value table 6 in the customer target power management server 300 at a frequency of about once per day.

In this way, power amount actual values of plural customers can be collected by providing the customer target power management server 300 outside the customer, and the target power consumption level in consideration of the power utilization rate of the utility grid for every customer can be set summarizingly at the outside.

Therefore, the target power setting function may not have a function of setting the target power consumption level in consideration of the power utilization rate of the utility grid for the plural respective customers.

Such a system of the present embodiment is suitable for being introduced to an industry developing plural stores, collective housings gathering plural households or the like.

Also, an actual power amount value can be held by an amount for a long period of time by making the customer target power management server as a large capacity server which is difficult to be installed in the store, and an accuracy of the predicted value of the power usage amount in setting the target power consumption level can be improved by using the actual power value for the long period of time.

Sixth Embodiment

Figure 11:
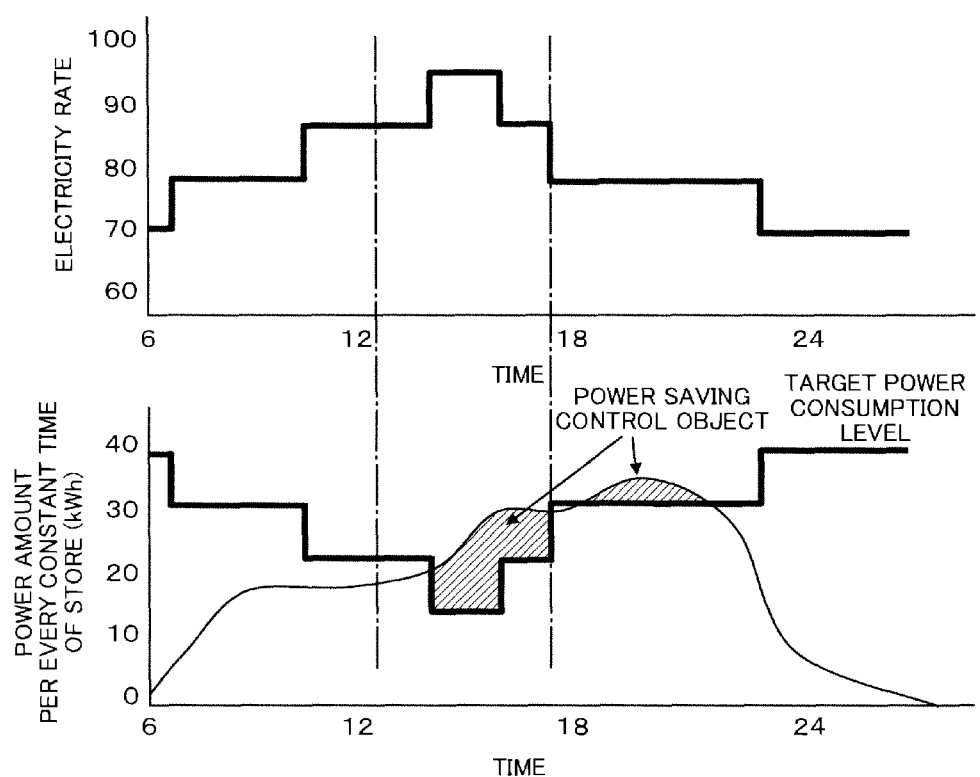
FIG. 11 illustrates diagrams of explaining a monitoring situation of a power monitoring device according to a sixth embodiment.

FIG. 11 illustrates diagrams of explaining a monitoring situation of a power monitoring device in a sixth embodiment.

The upper stage shows an electricity rate for respective time periods in which the power utilization rate of the utility grid is set not to exceed a limit in a power company. The electricity rate is set such that the higher the power utilization rate of the utility grid is, the higher the electricity rate is.

The lower stage shows a change of a measured value of the power amount for every constant time period at a certain store. The target power consumption level of the lower stage is set such that the higher the electricity rate is, the lower the target power consumption level is. Further, the power saving is made to carry out in a case where the measured value of the power amount exceeds the target power consumption level. Thereby, the higher the power utilization rate of the utility grid is, the more the power saving is made to carry out.

FIG. 12 shows a configuration diagram of the power monitoring device according to the sixth embodiment and a system including the same.

What differs from FIG. 2 is that the power utilization rate notifying server 200 of the utility grid is substituted for a respective time period electricity rate notifying server 400.

The power monitoring device 10 is connected to the respective electricity rate notifying server 400 of the utility grid at outside of the store 100 via the internet.

FIG. 13 shows a sequence diagram of the sixth embodiment. The target power setting function 1 requests the respective time period electricity rate notifying server 400 to transmit respective time period electricity rate information held by the respective time period electricity rate notifying server 400. The respective time period electricity rate information is information configured by time and an electricity rate shown at the upper stage of FIG. 11.

In response to the request, the respective time period electricity rate notifying server 400 transmits the respective time period electricity rate information, and the target power setting function 1 receives the same.

The target power setting function 1 sets the target power amount information for every unit time based on the respective electricity rate information received and registers the information to the target power amount table 3. The target power amount information is information configured by time and the target power amount as shown at the lower stage of FIG. 11.

Although the target power amount may be updated at an interval of once per day, for example, at 1:00 in the morning, the updating time and the updating interval are not limited thereby.

Comparison and assessment, notification, and control of the target power amount and the power usage amount which are carried out at the assessment and control function 2 are similar to those in the explanation of FIG. 3.

According to the present embodiment, the target power amounts are set based on the electricity rates of the respective time periods which are set such that the power utilization rate of the utility grid does not exceed the limit, and therefore, when the power usage exceeding the target power amount is reduced, the reduction can firmly contribute to stabilize the utility grid.

Further, the higher the electricity rate which is set such that the higher the power utilization rate of the utility rate, the higher the electricity rate, the smaller the target power amount, and therefore, when the power usage exceeding the target power amount is reduced, the reduction of the electricity rate and the reduction of the power utilization rate of the utility grid can compatibly be carried out.

Further, the reduction can be dealt with by only making the target power amount of the existing power monitoring device variable, and reconstruction or addition of function can be minimized.

LIST OF REFERENCE SIGNS

1: target power setting function, 2: assessment and control function, 3: target power amount table, 4: power amount actual value table, 5: target power configuring function, 6: customer power amount actual value table, 7: customer target power amount table, 10: power monitoring device, 20: watt-hour meter, 30: display device, 40: demand device, 100: store, 200: power utilization rate notifying server of utility grid, 300: customer target power management server, 400: respective time period electricity rate notifying server

The invention claimed is:

1. A power monitoring device which monitors power of a power consuming device using the power supplied from a utility grid, the power monitoring device comprising:
    a power amount actual value holding unit which holds an actual value of a power amount used in the power consuming device in the past;
    a target power setting unit which calculates a predicted value of a power usage amount used in the power consuming device using the actual value of the power amount, receives information indicating respective power utilization rates of respective time periods of the utility grid, changes a previously determined target power amount to a target power amount that is reduced from the predicted value of the power usage amount concerning a time period in which a respective power utilization rate is larger than a prescribed threshold, and sets respective target power amounts of the respective time periods; and
    an assessment and control unit which obtains the power usage amount used in the power consuming device, and performs control for performing power saving of the power consuming device in a time period in which the obtained power usage amount exceeds the target power amount.

2. The power monitoring device according to claim 1, wherein the target power amount is reduced from the predicted value of the power usage amount by a constant value.

3. The power monitoring device according to claim 1, wherein the assessment and control unit transmits notification information to notify information associated with power saving of the power consuming device, or transmits control information to cause the power consuming device perform to set the power saving to the power consuming device.

4. A power monitoring system configured by a plurality of power monitoring devices to monitor power of a power consuming device using the power supplied from a utility grid, and a power management server capable of being connected to the plurality of power monitoring devices by communication,
    wherein the power management server includes:
        a power amount actual value holding unit which holds an actual value of a power amount used in the power consuming device in the past for each of the plurality of power monitoring devices; and
        a target power configuring unit which receives information indicating respective power utilization rates of respective time periods of the utility grid, calculates a predicted value of a power usage amount used in the power consuming device using the actual value of the power amount for each of the plurality of power monitoring devices, changes a previously determined target power amount to a target power amount that is reduced from the predicted value of the power usage amount concerning a time period in which a respective power utilization rate is larger than a prescribed threshold, and configures respective target power amounts of the respective time periods; and
    wherein a power monitoring device of the plurality of power monitoring devices includes:
        a target power setting unit which sets respective target power amounts of respective time periods of the power monitoring device configured by the target power configuring unit; and
        an assessment and control unit which performs control for performing power saving of the power consuming device in a time period in which the power usage amount exceeds the respective target power amounts of the respective time periods of the power monitoring device.

5. The power monitoring system according to claim 4, wherein the target power amount is reduced from the predicted value of the power usage amount by a constant value.

6. The power monitoring system according to claim 4, wherein the assessment and control unit transmits notification information to notify information associated with power saving of the power consuming device, or transmits control information to cause the power consuming device to set the power saving to the power consuming device.

\* \* \* \* \*